Sept. 8, 1953 C. A. BERGFORS 2,651,722

ELECTRONIC MULTIVIBRATOR

Filed Dec. 29, 1948 2 Sheets-Sheet 1

INVENTOR
Carl A. Bergfors
BY A. J. Etienne
ATTORNEY

Sept. 8, 1953 C. A. BERGFORS 2,651,722

ELECTRONIC MULTIVIBRATOR

Filed Dec. 29, 1948 2 Sheets-Sheet 2

INVENTOR
Carl A. Bergfors
BY A. J. Etienne
ATTORNEY

Patented Sept. 8, 1953

2,651,722

UNITED STATES PATENT OFFICE 2,651,722

ELECTRONIC MULTIVIBRATOR

Carl A. Bergfors, Yonkers, N. Y., assignor to International Business Machines Corporation, New York, N. Y., a corporation of New York Application December 29, 1948, Serial No. 67,886

4 Claims. (Cl. 250—36)

This invention relates to high frequency vacuum tube oscillators and more particularly to a multivibrator type oscillator.

The conventional multivibrator uses two grid controlled vacuum tubes and the plate of each tube is connected to the control grid of the other tube through a capacitor.

Operation of the conventional multivibrator, particularly at high frequencies, is adversely affected by the input capacitance of the tubes which reduces the signal applied to the grids. Use of a cathode follower tube in each coupling lead greatly minimizes this effect since the extremely low impedance of the cathode follower provides an ideal source for driving the relatively high capacitance grids.

Briefly, the multivibrator of the invention employs four vacuum tubes. A first tube has its plate connected through a capacitor to the control grid of a third tube operated as a cathode follower which in turn controls the conduction of a second tube. The second tube has its plate connected through a capacitor to the control grid of a fourth tube operated as a cathode follower which in turn controls the conduction of the first tube. The first and second tubes may be considered as a two stage amplifier in which the output of each stage controls the input to the other while the third and fourth tubes comprise buffer networks between the respective outputs and inputs. For the purpose of clarity, the first and second tubes are referred to as multivibrator tubes herein and the third and fourth tubes as cathode follower tubes.

Accordingly, it is a principal object of this invention to provide a novel multivibrator having an upper frequency limit of operation higher than that obtainable from a conventional multivibrator.

Another object is to provide a multivibrator having better frequency stability than the conventional type multivibrator.

A further object is to provide a novel multivibrator circuit having substantially constant frequency stability over a wide range of supply voltage values.

Another object is to provide a multivibrator having a frequency of operation relatively nonresponsive to load variations as compared to that of the conventional multivibrator.

Still another object is to provide a multivibrator wherein a low impedance source is used to control the conduction of the multivibrator tubes.

A further object is to provide a multivibrator wherein the voltage at the plate of each multivibrator tube is used to trigger a cathode follower, the low impedance circuit of which is used to control the conduction of the other multivibrator tube.

Another object is to provide a multivibrator wherein the voltage at the plates of the multivibrator tubes is employed to control the conduction of a tube having lower input capacitance than the multivibrator tubes.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 3 is a circuit diagram of another embodiment.

Since one of the chief limiting factors affecting the upper operating speed of conventional dual-tube multivibrator is the input capacitance of the triode amplifier tubes used, it is necessary to change the circuit arrangement if the upper operating speed of the multivibrator is to be extended appreciably. Such is obtained in this invention by the use of the cathode follower coupled multivibrator.

To obtain a reliable appraisal of the advantages obtained by use of resistance loaded cathode followers responsive to a change of the plate voltage of each of the multivibrator tubes, it is necessary to determine the input capacitance of both the multivibrator and cathode follower tubes.

Figure 1:
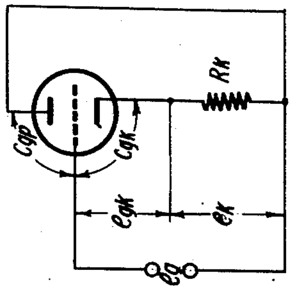
Fig. 1 is an equivalent circuit diagram of a cathode follower with a pure resistance load.
Figure 2:
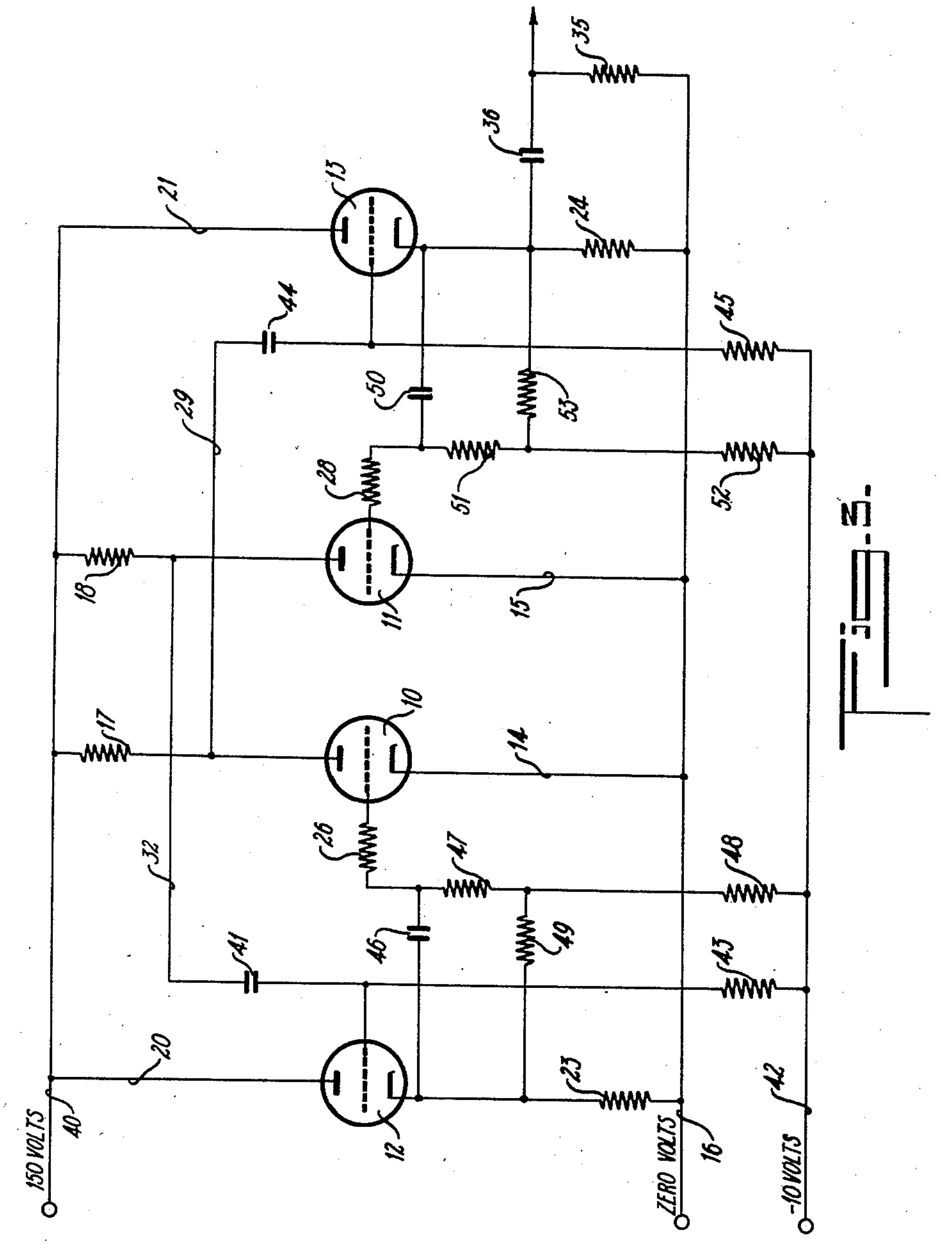

Analysis of the cathode follower will be undertaken with reference to Fig. 1 showing the equivalent circuit for a pure resistance loaded cathode follower having a load $R_k$. The voltage $e_g$ is impressed on the control grid of the tube and the output voltage $e_k$ appears across the resistor $R_k$. The capacitance between the control grid and cathode of the tube is represented by $C_{gk}$ and the capacitance between the control grid and plate of the tube is represented by $C_{gp}$.

It is fundamental that the voltage amplification obtained by any amplifier is the ratio of the output voltage to the input voltage.

The voltage amplification, A, obtained in a cathode follower is the ratio of the cathode voltage, $e_k$, to the control grid voltage $e_g$ or $$A=\frac{e_k}{e_g}$$

hence;

$$e_k=Ae_g \qquad (M)$$

Also the control grid voltage relative to the cathode is designated as $e_{gk}$ and may be written as $$e_{gk}=e_g-e_k \qquad (N)$$

Now, substituting the value of $e_k$ expressed in (M) for $e_k$ in (N) the following equation is obtained $$e_{gk}=e_g-Ae_g \qquad (O)$$

The charge, Q, across any capacitor is equal to the value of the capacitance, C, times the voltage, E, across the capacitor, this is expressed by;

$$Q=CE \qquad (P)$$

It follows that the charge on the control grid $Q_{gk}$, due to the grid-cathode capacitance is expressed by the following equation;

$$Q_{gk}=C_{gk}e_{gk} \qquad (Q)$$

Now, substituting the value of $e_{gk}$ found in (O) in (Q) the following is obtained;

$$Q_{gk}=C_{gk}(e_g-Ae_g) \qquad (R)$$

Also, the charge on the control grid, $Q_{gp}$, due to the grid-plate capacitance is expressed by the following equation;

$$Q_{gp}=C_{gp}e_g \qquad (S)$$

The total charge on the control grid, $Q_g$, is equal to the sum of the charges due to the grid-cathode and grid-plate capacitances, hence by adding (R) and (S) the value of $Q_g$ is obtained;

$$Q_g=C_{gp}e_g+C_{gk}(e_g-A_{eg}) \qquad (T)$$

From (P) the capacitance C, may be written as;

$$C=\frac{Q}{E} \qquad (U)$$

It follows that the effective input capacitances, $C_g$, is obtained by dividing (T) by $e_g$, hence, $$C_g=C_{gp}+C_{gk}-AC_{gk} \qquad (V)$$

In a similar manner the well known equation for the input capcitance of a resistance plate loaded triode amplifier may be derived. This equation is as follows;

$$C_g=C_{gp}+C_{gk}+AC_{gp} \qquad (W)$$

Equation V indicates that the input capacitance of the cathode follower is less than the sum of the grid-plate and grid-cathode capacitance by the amount of the voltage amplification times the grid-plate capacitance. The subtraction of the quantity $AC_{gk}$ indicates that the voltage applied to the control grid of the tube is in phase with the voltage on the cathode. This means that the feedback voltage through the grid-cathode capacitance is in phase with and tends to sustain the impressed signal voltage. Hence, in the cathode follower circuit, the feed-back caused by the grid-cathode capacitance is utilized to decrease the total input capacitance.

On the other hand equation (W) indicates that the input capacitance of a resistance plate loaded triode amplifier, is greater than the sum of the grid-plate and grid-cathode capacitance by the amount of the voltage amplification times the grid-plate capacitance. The addition of the quantity $AC_{gp}$ indicates that the voltage applied to the control grid is 180 degrees out of phase with the plate voltage. This means that the feedback voltage through the grid-plate capacitance opposes the voltage applied to the control grid. Hence, in the plate loaded amplifier circuit the grid-plate capacitance serves to increase the total input capacitance whereas, in the cathode follower circuit, the grid-cathode capacitance is utilized to decrease the total input capacitance.

In order to appreciate fully the advantages of the use of the cathode follower circuit the effect of its decreased input capacitance will be pursued further.

The grid-cathode capacitance, $C_{gk}$ of a 12AU7 type tube, including the capacitance of the socket, is approximately 1.80 micromicrofarads and the grid-plate capacitance, $C_{gp}$, is approximately 1.75 micromicrofarads. The voltage amplification, A, obtained when this tube is used in a dual-tube multivibrator having the plate of each tube connected to the control grid of the other is approximately 10, while the measured value of voltage amplification of the tube used in a cathode follower circuit is 0.968. By substituting the above values in Equation W the input capacitance, $C_g$, of this tube in the multivibrator having the plate of each tube connected to the control grid of the other, is found by computation to be about 21 micromicrofarads. By substituting the above values in Equation V the input capacitance, $C_g$, of the tube, used as a cathode follower, is found to be only 1.8 micromicrofarads.

Obviously, the input capacitance of this tube, used in the trigger, is almost twelve times that of this tube used in the cathode follower circuit. Hence, by connecting the plates of each amplifier tube to the control grids of the cathode follower tubes, respectively, the capacitive load on the plates of the amplifier tubes is decreased by a factor of twelve. The limiting effect of grid current on the frequency of the output is eliminated since the voltage on the control grids of the cathode follower tubes is never more positive than the voltage on their respective cathodes.

Despite the fact that the control grids of the amplifier tubes present a relatively heavy load, the operation of the multivibrator is substantially unaffected thereby because the voltage on these control grids is supplied from the cathode or low impedance circuit of the cathode follower tubes, respectively. Hence, the current flowing from the control grid to the cathode of the cathode follower tubes, automatically adjusts itself to a substantially constant value, notwithstanding the load presented by the control grids of the amplifier tubes.

The novel use of cathode followers in a multivibrator circuit reduces the time required for the multivibrator to switch from either stable condition to the other. This makes a high frequency output possible at normal pulse amplitudes and provides high frequency stability despite wide variation in the supply voltages and variation in the load. In such an arrangement any suitable type tubes may be used including the miniature type.

While this invention will be described with reference to certain miniature type tubes and the actual values of the components employed therewith, it is understood that the invention is not so limited but that in accordance with the teachings of the invention, any suitable type tubes may be employed and any desired component values used which will satisfy the requirements of each particular case.

Figure 2:
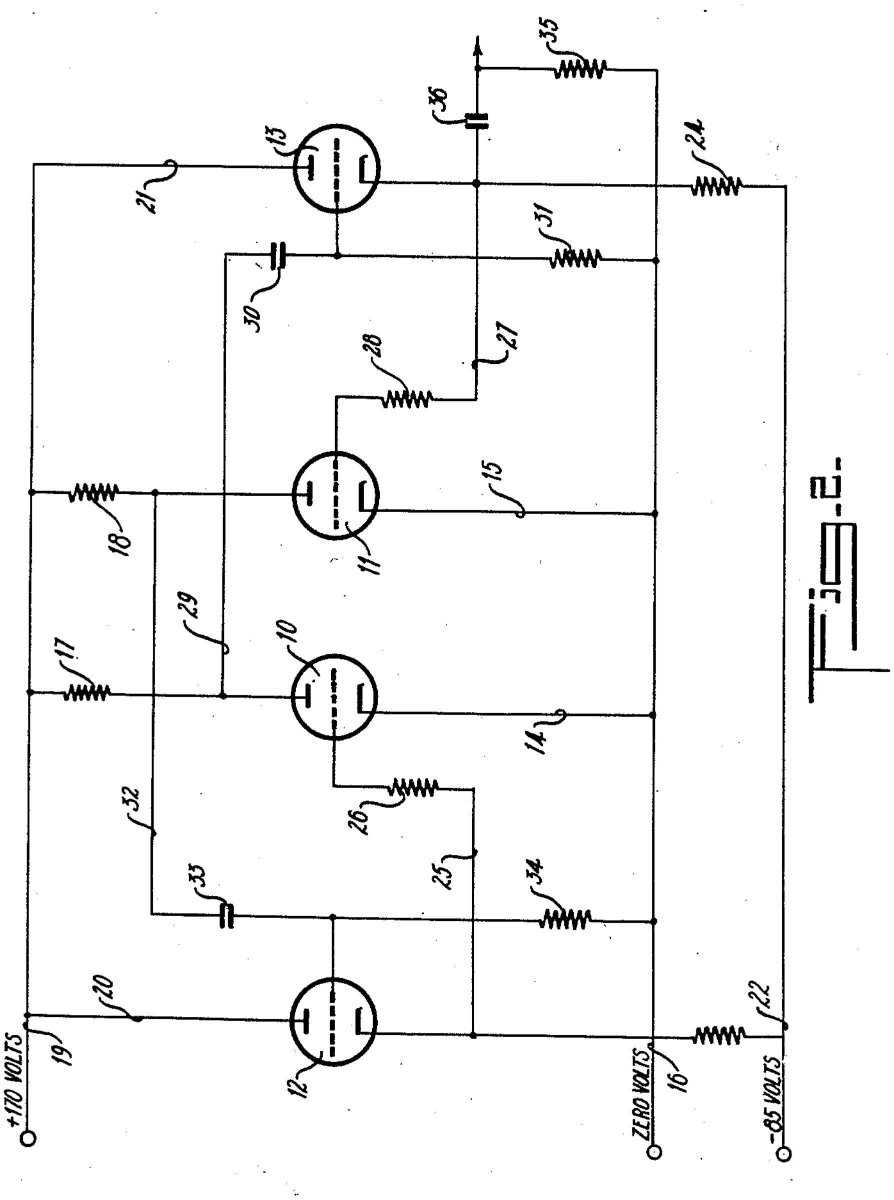
Fig. 2 is a circuit diagram of one embodiment of the novel multivibrator of the invention.

Referring more particularly to Fig. 2, the trigger is illustrated as comprising a pair of multivibrator tubes 10 and 11 and two cathode follower tubes 12 and 13. These tubes are actually sections of a 12AU7 miniature type twin triode tube but will be referred to herein as tubes, to facilitate the description.

The cathodes of the tubes 10 and 11 are connected through conductors 14 and 15, respectively, to a zero volt line 16. The plates of the tubes 10 and 11 are connected through resistors 17 and 18, respectively, each of 20,000 ohms, to a plus 170 volt line 19.

The plates of the tubes 12 and 13 are directly connected to the plus 170 volt line 19 through conductors 20 and 21, respectively, and their cathodes to a minus 85 volt line 22, through resistors 23 and 24, respectively, each of 8,200 ohms. The cathode of the tube 12 is directly connected to the control grid of the tube 10 through a conductor 25 and a resistor 26 of 300 ohms. The cathode of the tube 13 is directly connected to the control grid of the tube 11 through a conductor 27 and a resistor 28 of 300 ohms. The resistors 26 and 28 are provided to suppress parasitic oscillations.

The plate of tube 10 is connected through a conductor 29 and a capacitor 30 of 0.00005 microfarad to the control grid of the tube 13. The control grid of tube 13 is connected through a resistor 31 of 4,700 ohms to the zero volt line 16.

The plate of tube 11 is connected through a conductor 32 and a capacitor 33 of 0.00005 microfarad to the control grid of the tube 12. The control grid of the tube 12 is connected through a resistor 34 of 4,700 ohms to the zero volt line 16.

The output of the multivibrator is developed across the load resistor 35 of 500,000 ohms. This resistor 35 is connected at one end to the zero volt line 16 and at the other end to the capacitor 36 of 0.00025 microfarad the other side of which is connected to the cathode of the cathode follower tube 13.

The multivibrator as above described generates a frequency of approximately 840 kilocycles. But, it is understood that circuit components may be varied over a wide range of values to effect operation at different frequencies.

To operate the multivibrator, the heaters (not shown) of the tubes are turned on permitting the cathodes to reach operating temperature, then voltage is supplied to the plus 170 volt line 19 and the minus 85 volt line 22.

Since the control grids of the cathode follower tubes 12 and 13 are connected to the zero volt line 16 and the cathodes of these tubes are connected to the minus 85 volt line 22, the control grids are at a relatively higher voltage than the cathodes. As a result tubes 12 and 13 are initially conductive and the voltage at their cathodes rises. The increased voltage at the cathodes of tubes 12 and 13, caused by their conduction, is transferred to the control grids of tubes 10 and 11, respectively, through conductor 25 and resistor 26 on one hand and through conductor 27 and resistor 28 on the other. This increased voltage on the control grids of tubes 10 and 11 renders them conductive.

However, because of the circuit arrangement and small irregularities in the values of the components used and small differences in the characteristics of the tubes, all four tubes do not remain conductive. When the conduction of either tube changes, it creates an unbalanced effect in the circuit and either tubes 10 and 12 or tubes 11 and 13 are rendered non-conductive.

For the purpose of description, it is assumed that the unbalanced effect is created by a slight increase in the conduction of multivibrator tube 11. This causes the voltage at the plate of tube 11 to decrease. The negative pulse at the plate of tube 11 is transferred over conductor 32 and capacitor 33 to the control grid of tube 12. This causes a decrease in the conduction of tube 12 and a corresponding decrease in the voltage at its cathode. The negative pulse thus produced at the cathode of tube 12 is transferred over conductor 25 and resistor 26, to the control grid of tube 10, to effect a decrease in the conduction of this tube.

The resulting positive pulse at the plate of the tube 10 is transferred over conductor 29 and capacitor 30 to the control grid of tube 13 which causes an increase the conduction of that tube and a corresponding increase in the voltage at its cathode. The positive pulse thus produced at the cathode of tube 13 is transferred over conductor 27 and resistor 28 to the control grid of tube 11 causing this tube to become still more conductive and the voltage at its plate to become more negative. This cumulative change in the conduction of the tubes is continued until tubes 10 and 12 reach cut off and tubes 11 and 13 are rendered fully conductive.

At the instant when tubes 10 and 12 reach cut off, the plate potential of tube 10 is at a maximum value which equals that of line 19. The control grid and hence the cathode of tube 13, as well as the grid of tube 11 are all at a positive maximum potential. It follows that the plate potential of tube 11 has therefore reached its minimum value and can no longer provide capacitor 33 with a negative charge. The existing charge therefore begins to leak off via line 32 and resistor 18 to line 19. This charge, however, has a maximum value sufficient to drive the grid of tube 12 to approximately minus 110 volts, or 25 volts negative with respect to cathode. As this charge begins to leak off, the grid potential of tube 12 rises accordingly. All other tube element potentials remain at their respective maximum or minimum values until sufficient charge has leaked off of capacitor 33 to raise the grid potential of tube 12 to its critical bias value. Tube 12 then begins to conduct.

This positive pulse at the cathode of the tube 12 transferred over conductor 25 and resistor 26 to the control grid of tube 10 which becomes conductive and the voltage at its plate decreases accordingly. The negative pulse at the plate of tube 10 is transferred over the conductor 29 and the capacitor 30 to the control grid of tube 13. Tube 13 becomes less conductive and the voltage at its cathode is decreased. The negative pulse at the cathode of tube 13 is transferred over conductor 27 and resistor 28 to the control grid of tube 11 which becomes less conductive and causes the voltage at its plate to increase.

The positive pulse at the plate of tube 11 is transferred over conductor 32 and capacitor 33 to the control grid of tube 12 to cause it to become more conductive and the voltage at its cathode to increase. The positive pulse at the cathode of tube 12 is transferred over conductor 25 and resistor 26 to the control grid of tube 10 to render tube 10, more conductive, and cause a further decrease in the voltage at its plate. This cumulative change in the conduction of the tubes is continued until tubes 10 and 12 reach a state of maximum conduction and tubes 11 and 13 are rendered non-conductive.

Similarly, the second half of the cycle continues until tubes 11 and 13 are conductive and tubes 10 and 12 are non-conductive to thus complete one full cycle of operation.

Referring to Fig. 3, the plates of the multivibrator tubes 10 and 11 are connected to a plus 150 volt line 40 through resistors 17 and 18, respectively, each of 20,000 ohms. The cathode of the cathode follower tube 12 is connected to the zero volt line 16 through resistor 23 of 8,200 ohms and the cathode of the cathode follower tube 13 is connected to the zero volt line 16 through resistor 24 of 8,200 ohms. The control grid of tube 12 is connected through a capacitor 41 of 0.0001 microfarad and conductor 32 to the plate of tube 11 and also to a minus 10 volt line 42, through a resistor 43 of 100,000 ohms. The control grid of tube 13 is connected through a capacitor 44 of 0.0001 microfarad and conductor 29 to the plate of tube 10 and also to the minus 10 volt line 42, through a resistor 45 of 100,000 ohms.

The cathode of tube 12 is connected to the control grid of the tube 10 through a capacitor 46 of 0.00005 microfarad and resistor 26 of 100 ohms. The junction of the resistor 26 and capacitor 46 is connected through a current limiting resistor 47 and resistor 48 of 20,000 ohms and 47,000 ohms, respectively, to the minus 10 volt line 42. The junction of the resistors 47 and 48 is connected through a resistor 49 of 36,000 ohms to the cathode of tube 12.

Likewise, the cathode of tube 13 is connected to the control grid of tube 11 through a capacitor 50 of 0.00005 microfarad and resistor 28 of 100 ohms. The junction of resistor 28 and capacitor 50 is connected through a current limiting resistor 51 and resistor 52, of 20,000 ohms and 47,000 ohms, respectively, to the minus 10 volt line 42. The junction of resistors 51 and 52 is connected through a resistor 53 of 36,000 ohms to the cathode of tube 13.

The components and connections not specifically pointed out with reference to Fig. 3 are identical with the corresponding part of Fig. 2 and are designated by the same numeral.

The multivibrator shown in Fig. 3, when operated with the components and voltage values as given above, generated an output frequency of approximately 158 kilocycles across load resistor 35. The frequency stability of this multivibrator was determined by means of frequency measuring equipment accurate to 1 part in 100,000. Varying the potential of line 42 from zero to minus 12 volts produced no measurable change in frequency, while varying the potential of line 40 produced a frequency variation of 1 part in 2000 or 0.05%. This frequency stability is obtained so long as the minus 10 volt line 42 is maintained negative. If the voltage on line 42 is made positive with respect to the line 16 the output frequency of the multi-vibrator is a function of the value of the voltage on line 42. When the voltage on the line 42 was increased to a positive value of 50 volts, the output frequency was increased by a factor of approximately 2.7.

While there have been shown and described and pointed out the fundamental novel features of the invention as applied to a preferred embodiment, it will be understood that various omissions and substitutions and changes in the form and details of the circuit illustrated and in its operation may be made by those skilled in the art, without departing from the spirit of the invention. It is the intention, therefore, to be limited only as indicated by the scope of the following claims.

What is claimed is:

1. A multivibrator including means for applying operating voltages thereto, first and second multivibrator tubes, alternately automatically conductive and non-conductive and vice versa, a third tube operated as a cathode follower, a fourth tube operated as a cathode follower, a capacitor connected between the plate of the first tube and the control grid of the third tube, a capacitor connected between the plate of the second tube and the control grid of the fourth tube, a connection from the cathode of the third tube to the control grid of the second tube, and a connection from the cathode of the fourth tube to the control grid of the first tube.

2. A multivibrator including first and second grid controlled tubes alternately automatically conductive and non-conductive and vice versa; plate resistors in the plate circuit of said tubes; third and fourth grid controlled tubes having their plates connected directly to a voltage source and their cathodes connected to another voltage source through a resistor in the cathode circuit of each; a capacitive connection from the plate of the first tube to the control grid of the third tube for rendering said third tube less conductive and more conductive, respectively, when said first tube becomes more conductive and less conductive; a resistive connection from the cathode of the third tube to the control grid of the second tube for rendering the second tube more conductive and less conductive, respectively, as the third tube becomes more conductive and less conductive; a capacitive connection from the plate of the second tube to the control grid of the fourth tube for rendering said fourth tube more conductive and less conductive, respectively, when said second tube becomes less conductive and more conductive, and a resistive connection from the cathode of the fourth tube to the control grid of the first tube for rendering the first tube more conductive and less conductive, respectively, as the fourth tube becomes more conductive and less conductive.

3. A multivibrator including first and second grid controlled tubes alternately automatically conductive and non-conductive and vice versa; plate resistors in the plate circuit of said tubes; third and fourth grid controlled tubes each having their plates connected directly to a voltage source and their cathodes connected to another voltage source through a resistor in the cathode circuit of each, the cathodes of said first and second tubes being also connected to the latter voltage source; a capacitive connection from the plate of said first tube to the control grid of said third tube for rendering said third tube more conductive and less conductive respectively when said first tube is less conductive and more conductive; a capacitive connection from the plate of the second tube to the control grid of the fourth tube to render said fourth tube more conductive and less conductive respectively when said second tube is less conductive and more conductive; control grid bias resistors for each of said tubes; a capacitive resistive connection from the cathode of the third tube to the control grid of the second tube and a resistive connection from the control grid bias resistor of the second tube to the cathode of the third tube; a capacitive resistive connection from the cathode of the fourth tube to the control grid of the first tube, and a resistive connection from the control grid bias resistor of the first tube to the cathode of the fourth tube.

4. A multivibrator comprising a two-stage grid controlled amplifier each stage having an output and an input terminal connected so that the output of each stage controls the input to the other, a cathode follower comprising a tube having at least one grid and connected between the output terminal of each stage and in the input terminal of the other, and circuit means preventing current flow in the grid circuits of the tubes of said cathode follower whereby the frequency of said multivibrator is maintained constant within 0.05%.

CARL A. BERGFORS.

References Cited in the file of this patent

UNITED STATES PATENTS

| Number | Name | Date |
|---|---|---|
| 2,416,292 | Dodington | Feb. 25, 1947 |
| 2,418,826 | Engstrom | Apr. 15, 1947 |
| 2,441,579 | Kenyon | May 18, 1948 |
| 2,454,815 | Levy | Nov. 30, 1948 |
| 2,515,271 | Smith | July 18, 1950 |
| 2,540,539 | Moore | Feb. 6, 1951 |